(12) United States Patent
Joo et al.

(10) Patent No.: US 12,523,969 B2
(45) Date of Patent: Jan. 13, 2026

(54) METHOD AND APPARATUS FOR PERFORMING OPTIMAL CONTROL BASED ON DYNAMIC MODEL

(71) Applicants: MakinaRocks Co., Ltd., Seoul (KR); Hanon Systems, Daejeon (KR)

(72) Inventors: Sungho Joo, Seoul (KR); Jeonghoon Lee, Sejong-Si (KR); Joongjae Kim, Daejeon (KR); Je Yeol Lee, Seoul (KR); Dongmin Lee, Seoul (KR); Minseop Kim, Seoul (KR)

(73) Assignees: MakinaRocks Co., Ltd., Seoul (KR); Hanon Systems, Daejeon (KR)

( * ) Notice: Subject to any disclaimer, the term of this patent is extended or adjusted under 35 U.S.C. 154(b) by 133 days.

(21) Appl. No.: 18/020,835

(22) PCT Filed: Jun. 10, 2022

(86) PCT No.: PCT/KR2022/008197
§ 371 (c)(1),
(2) Date: Feb. 10, 2023

(87) PCT Pub. No.: WO2022/265306
PCT Pub. Date: Dec. 22, 2022

(65) Prior Publication Data
US 2024/0176311 A1    May 30, 2024

(30) Foreign Application Priority Data

Jun. 17, 2021 (KR) .......................... 10-2021-0078422
Jun. 17, 2021 (KR) .......................... 10-2022-0053593

(51) Int. Cl.
*G05B 13/02* (2006.01)

(52) U.S. Cl.
CPC ................................ *G05B 13/027* (2013.01)

(58) Field of Classification Search
CPC .................................................... G05B 13/027
(Continued)

(56) References Cited

U.S. PATENT DOCUMENTS 12,153,385 B2 * 11/2024 Barrett ................... G06N 20/00
2005/0075993 A1   4/2005 Jang et al.
(Continued)

FOREIGN PATENT DOCUMENTS

KR   10-2020-0062887 A   6/2020
KR   10-2021-0006874 A   1/2021
(Continued)

OTHER PUBLICATIONS

Emmanuel Okafor et al., "Heuristic and deep reinforcement learning-based PID control of trajectory tracking in a ball-andplate system", Journal of Information and Telecommunication, Oct. 21, 2020 (19 pgs).
(Continued)

*Primary Examiner* — Md Azad
(74) *Attorney, Agent, or Firm* — Harris Beach Murtha Cullina PLLC

(57) ABSTRACT

According to an exemplary embodiment of the present disclosure, a dynamic model based optimal control method performed by a computing device including at least one processor is disclosed. The method includes acquiring state information including at least one state variable; calculating first control information by inputting the state information to a reinforcement learning control model; calculating second control information from the state information based on a feedback control algorithm; determining a sample similarity of the state information using a trained dynamic model; and calculating optimal control information based on the first control information, the second control information, and the sample similarity.

18 Claims, 11 Drawing Sheets

(58) Field of Classification Search
USPC .......................................................... 700/48
See application file for complete search history.

(56) References Cited

U.S. PATENT DOCUMENTS

| | | | |
|---|---|---|---|
| 2019/0041811 | A1 | 2/2019 | Drees |
| 2019/0187631 | A1* | 6/2019 | Badgwell ............... G06N 3/006 |
| 2019/0309979 | A1 | 10/2019 | Hurley et al. |
| 2020/0050920 | A1 | 2/2020 | Idgunji et al. |
| 2020/0167611 | A1 | 5/2020 | Yoon et al. |
| 2021/0132552 | A1* | 5/2021 | Lawrence .......... G05B 13/0265 |
| 2021/0341895 | A1* | 11/2021 | Havlena ................. G06N 3/006 |
| 2022/0068477 | A1* | 3/2022 | Glasfurd ................ A61B 5/082 |

FOREIGN PATENT DOCUMENTS

| | | |
|---|---|---|
| KR | 10-2021-0044177 A | 4/2021 |
| KR | 102247165 B1 | 4/2021 |
| KR | 10-2021-0068378 A | 6/2021 |

OTHER PUBLICATIONS

Abhishek Kadian et al., "Sim2Real Predictivity: Does Evaluation in Simulation Predict Real-World Performance?", IEEE Robotics and Automation Letters. Preprint Version. Accepted Jun. 2020 (8 pgs).

\* cited by examiner

【Figure 1】
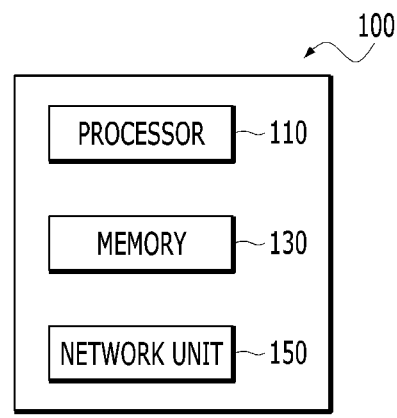

[Figure 2]
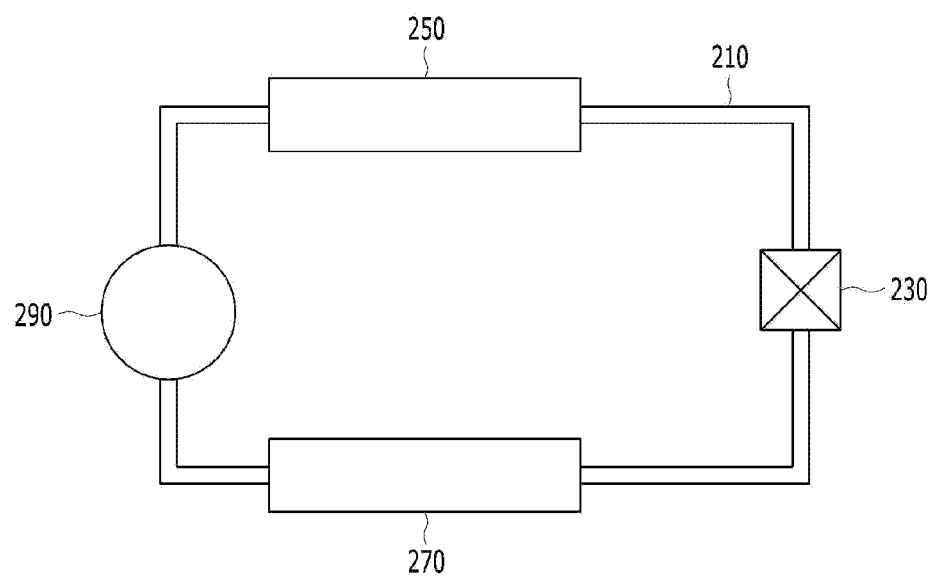

[Figure 3]
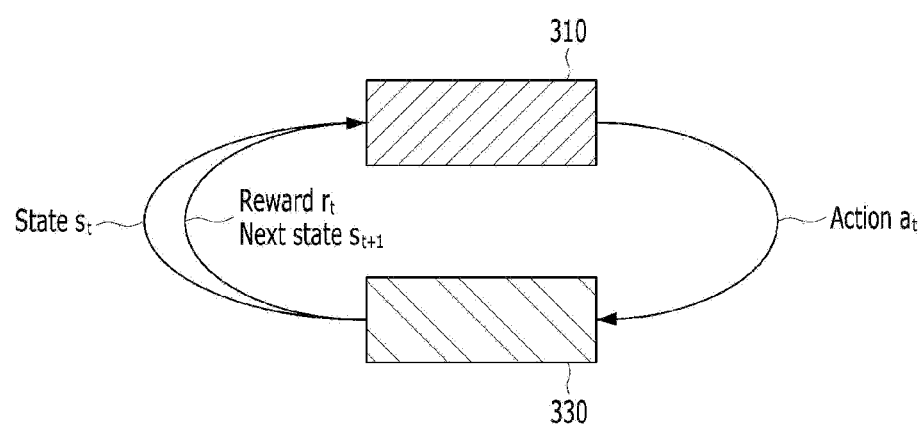

【Figure 4】
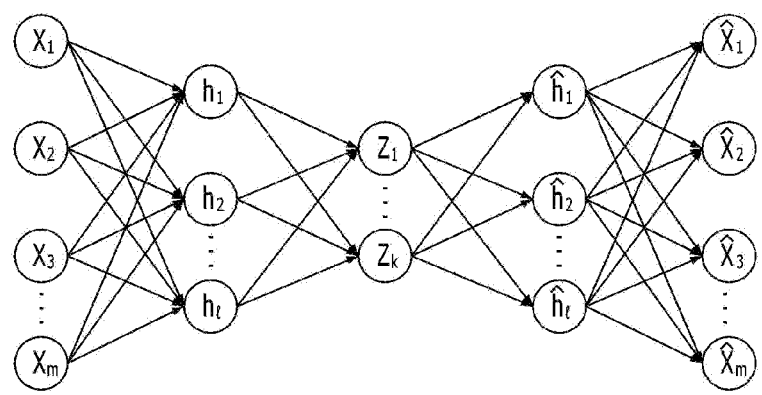

[Figure 5]
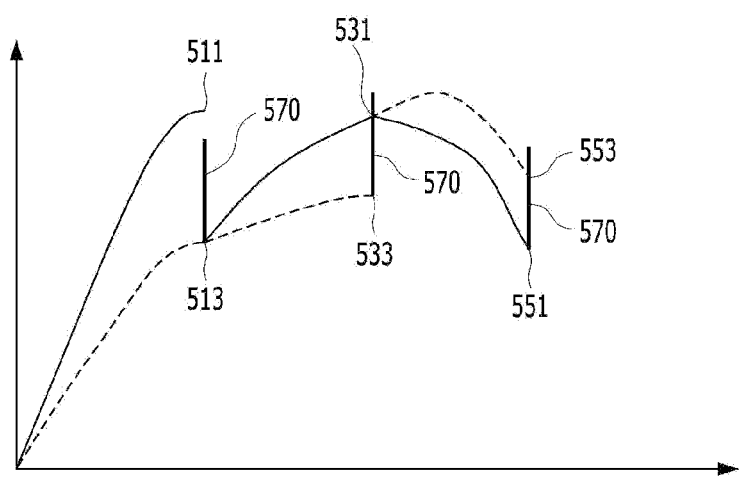

【Figure 6】
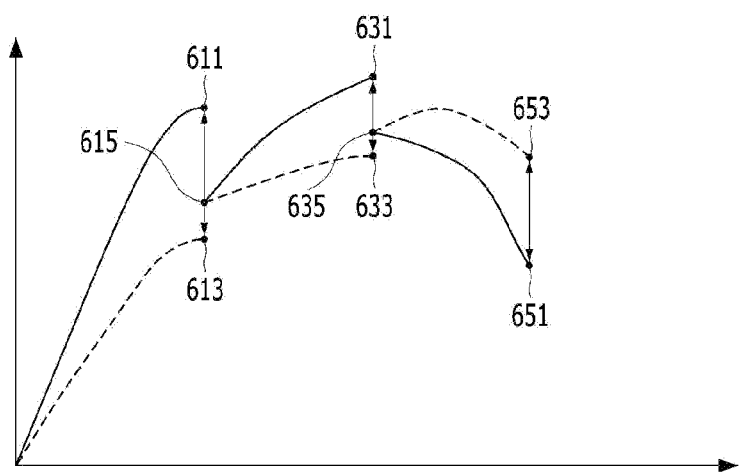

【Figure 7】
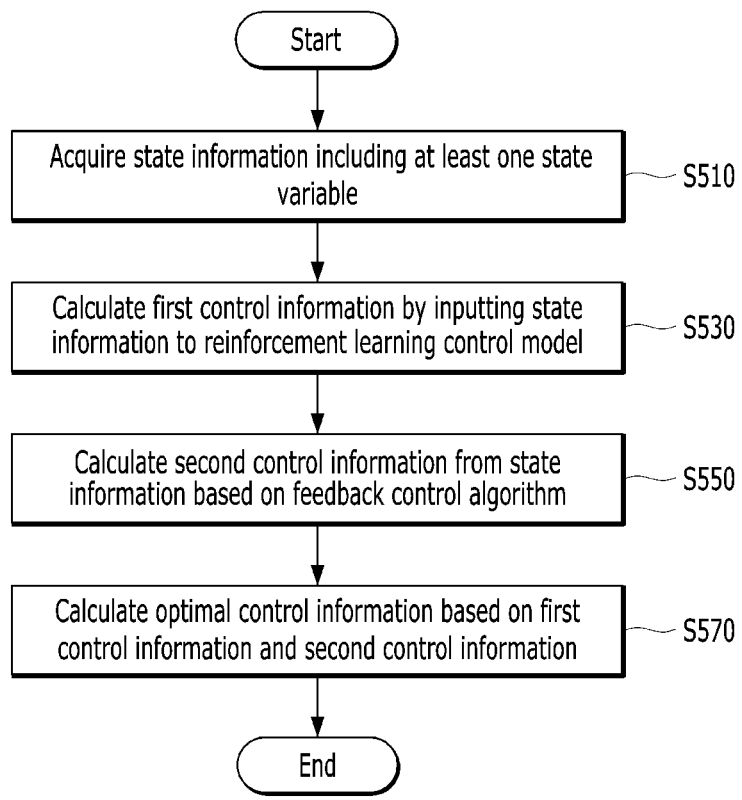

【Figure 8】
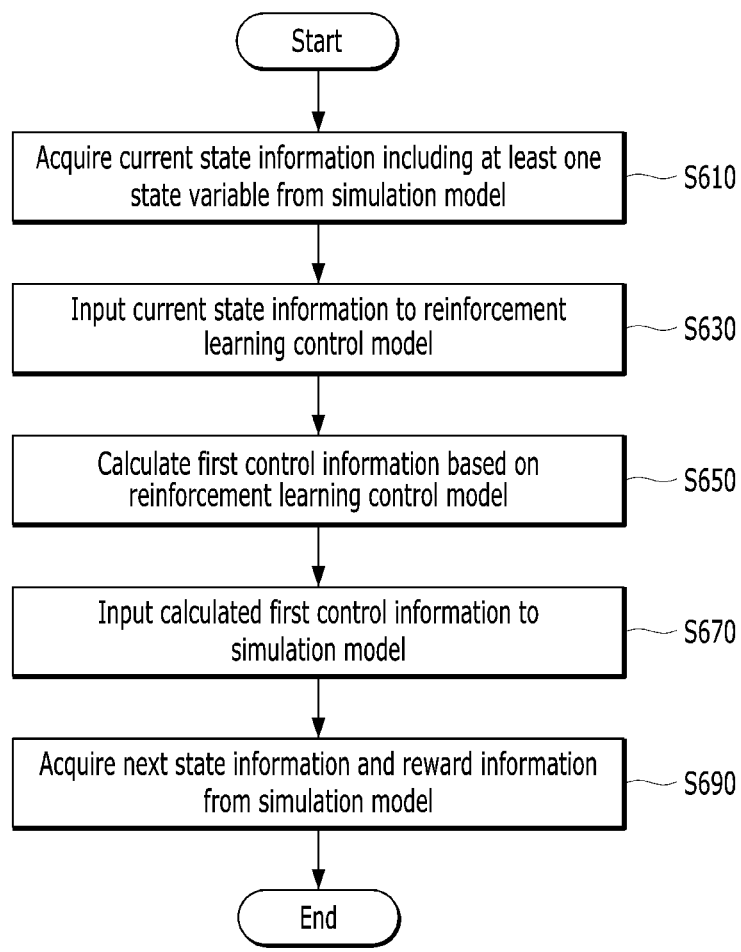

【Figure 9】
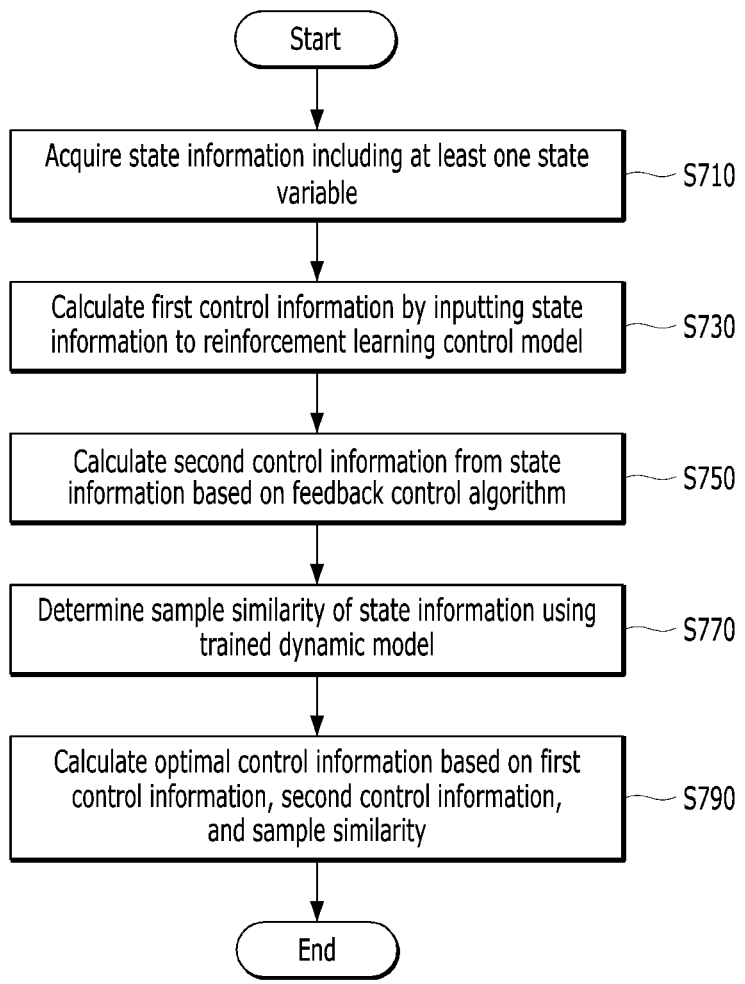

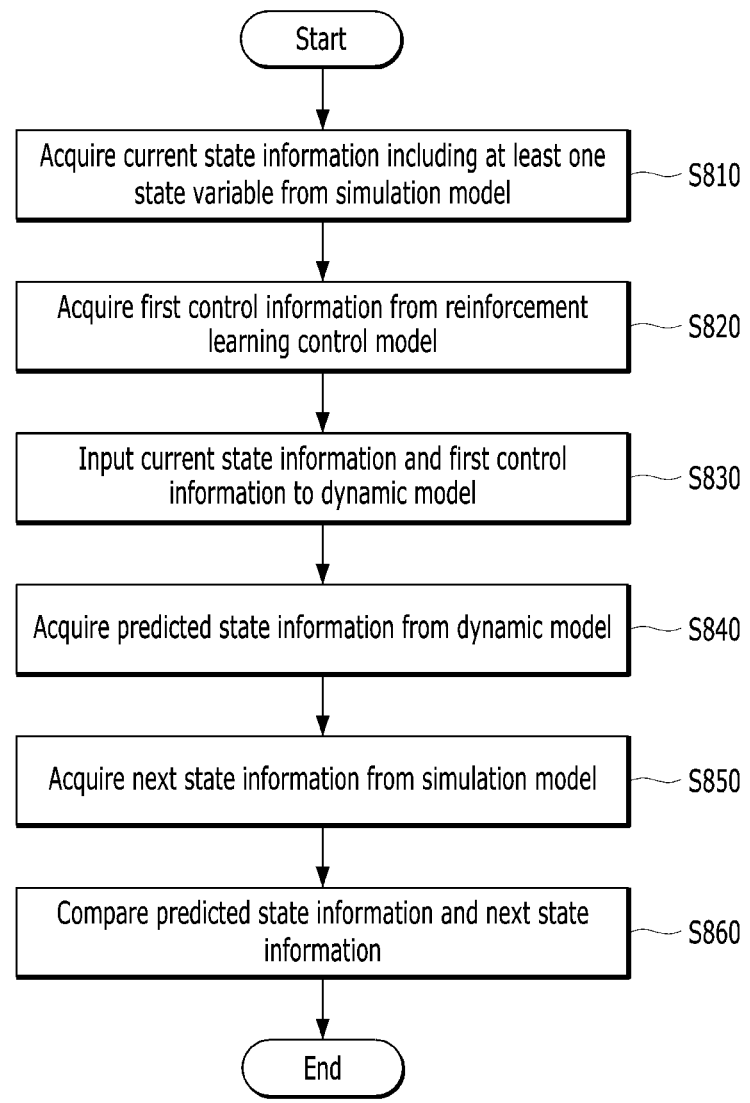
【Figure 10】

[Figure 11]
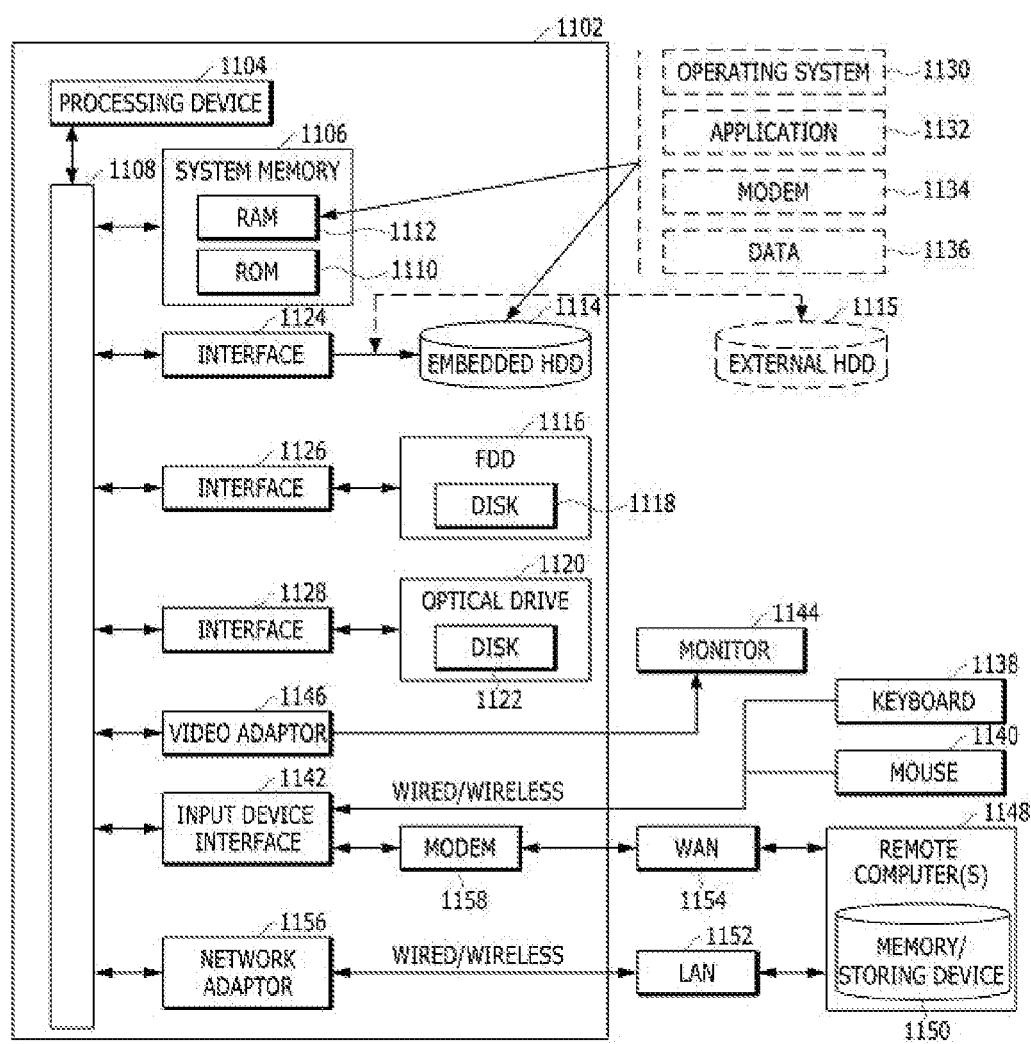

METHOD AND APPARATUS FOR PERFORMING OPTIMAL CONTROL BASED ON DYNAMIC MODEL

CROSS-REFERENCE TO RELATED APPLICATIONS

This application is a national stage application under 35. U.S.C. § 371 of PCT Application No PCT/KR2022/008197, filed on Jun. 10, 2022, which claims priority to, and the benefit of Korean Application No. 10-2021-0078422 filed on Jun. 17, 2021 and Korean Application No. 10-2022-0053593 filed on Jun. 17, 2021, which are incorporated herein by reference in their entirety.

TECHNICAL FIELD

The present disclosure relates to an optimal control method, and more particularly, to an optimal control method based on a dynamic model and a reinforcement learning method.

BACKGROUND ART

In the related art, as a control method for energy management, a proportional-integral differential (PID) control algorithm which is a feedback based algorithm has been mainly used. The PID control algorithm is an algorithm which performs the control based on an error of a current value and a target value of a control variable.

In the meantime, in accordance with the development of the artificial neural network technology, in the related art, an attempt has been made to control using reinforcement learning technique, recently. However, the reinforcement learning technique tends to depend on the learning data so that there is a problem in that the technique cannot appropriately cope with new data type which is different from the learning data.

Accordingly, in the related art, there is a demand for an optimal control solution to harmoniously use the existing feedback based control and the reinforcement learning based control.

In Korean Unexamined Patent Application Publication No. "KR2020-0062887", an apparatus and a method for guaranteeing a quality of a control operation of a system based on the reinforcement learning have been disclosed.

DISCLOSURE

Technical Problem

The present disclosure has been made to correspond to the above-described background art and an object thereof is to provide an optimal control method based on a dynamic model and a reinforcement learning method.

Technical Solution

In order to achieve the above-described objects, according to an aspect of the present disclosure, a dynamic model based optimal control method which is performed by a computing device including at least one processor is disclosed. The method includes acquiring state information including at least one state variable; calculating first control information by inputting the state information to a reinforcement learning control model; calculating second control information from the state information based on a feedback control algorithm; determining a sample similarity of the state information using a trained dynamic model; and calculating optimal control information based on the first control information, the second control information, and the sample similarity.

In an alternative exemplary embodiment, the state information is acquired according to a previously determined time interval during a process of driving a vehicle.

In an alternative exemplary embodiment, the state information includes at least one state variable among state variables about temperature data, subcool data, compressor output data, valve open/close data, or heater output data.

In an alternative exemplary embodiment, the dynamic model is a model for simulating an operation of an environment model, input data of the dynamic model includes state information and control information, and the output data of the dynamic model includes predicted state information.

In an alternative exemplary embodiment, the predicted state information included in the output data corresponds to a timing later than a timing corresponding to state information included in the input data.

In an alternative exemplary embodiment, the dynamic model is trained based on a simulation model which trains the reinforcement learning control model.

In an alternative exemplary embodiment, the dynamic model is trained based on a learning method including: acquiring current state information including at least one state variable from a simulation model; acquiring first control information from the reinforcement learning control model; inputting the current state information and the first control information to the dynamic model; acquiring predicted state information from the dynamic model; acquiring next state information from the simulation model; and comparing the predicted state information and the next state information.

In an alternative exemplary embodiment, the sample similarity is determined based on predicted state information calculated based on the acquired state information and the dynamic model.

In an alternative exemplary embodiment, the sample similarity is determined by a smaller value in a previously determined similarity range as an error calculated between the state information and the predicted state information increases.

In an alternative exemplary embodiment, the calculating of optimal control information is performed based on a result of a weighted sum operation based on the first control information, the second control information, and the sample similarity.

In an alternative exemplary embodiment, the calculating of optimal control information includes: determining a weight corresponding to each of the first control information and the second control information based on the sample similarity; and calculating optimal control information based on a result of a weighted sum operation according to the determined weight.

In an alternative exemplary embodiment, in the determining, the higher the sample similarity, the higher the ratio obtained by dividing a first weight corresponding to the first control information by a second weight corresponding to the second control information is set.

In an alternative exemplary embodiment, the dynamic model is consistently trained based on two or more state information acquired according to a time interval previously determined during the process of driving the vehicle.

In an alternative exemplary embodiment, the reinforcement learning control model is consistently trained by substituting a simulation model for learning into the consistently trained dynamic model.

In order to achieve the above-described objects, according to an aspect of the present disclosure, a computer program stored in a computer readable storage medium is disclosed. When the computer program is executed by one or more processors, the computer program performs the following operations to perform the dynamic model based optimal control and the operations include: an operation of acquiring state information including at least one state variable; an operation of calculating first control information by inputting the state information to a reinforcement learning control model; an operation of calculating second control information from the state information based on a feedback control algorithm; an operation of determining a sample similarity of the state information using a trained dynamic model; and an operation of calculating optimal control information based on the first control information, the second control information, and the sample similarity.

In order to achieve the above-described objects, according to an aspect of the present disclosure, an apparatus for performing optimal control based on a dynamic model, is disclosed. The apparatus includes: one or more processors, a memory; and a network unit and the one or more processors is configure to: acquire state information including at least one state variable; calculate first control information by inputting the state information to a reinforcement learning control model; calculate second control information from the state information based on a feedback control algorithm; determine a sample similarity of the state information using a trained dynamic model; and calculate optimal control information based on the first control information, the second control information, and the sample similarity.

Advantageous Effects

The present disclosure provides an optimal control method based on a dynamic model and a reinforcement learning method.

DESCRIPTION OF DRAWINGS

FIG. 1 is a block diagram of a computing device for performing optimal control according to an exemplary embodiment of the present disclosure.

FIG. 2 is an exemplary view conceptually illustrating some components for thermal exchange among components included in an energy control system.

FIG. 3 is a conceptual view illustrating a simulation model and a reinforcement learning control model to explain a reinforcement learning method.

FIG. 4 is a schematic view illustrating a neural network according to the present disclosure.

FIG. 5 is an exemplary view conceptually illustrating a variance of one control variable included in first control information and second control information over a time, according to an exemplary embodiment of the present disclosure.

FIG. 6 is an exemplary view conceptually illustrating a variance of one control variable included in first control information and second control information over a time, according to an exemplary embodiment of the present disclosure.

FIG. 7 is a flowchart illustrating a process of calculating optimal control information based on a reinforcement learning control model and a feedback control algorithm by a processor, according to an exemplary embodiment of the present disclosure.

FIG. 8 is a flowchart illustrating a process of training a reinforcement learning control model by a processor according to an exemplary embodiment of the present disclosure.

FIG. 9 is a flowchart illustrating a process of calculating optimal control information based on a reinforcement learning control model and a feedback control algorithm, and further based on a dynamic model, by a processor, according to an exemplary embodiment of the present disclosure.

FIG. 10 is a flowchart illustrating a process of training a dynamic model by a processor according to an exemplary embodiment of the present disclosure.

FIG. 11 illustrates a simple and general schematic view of an exemplary computing environment in which exemplary embodiments of the present disclosure are embodied.

MODE FOR INVENTION

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a block diagram of a computing device for performing optimal control according to an exemplary embodiment of the present disclosure. The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

In the present disclosure, the network unit 110 may be configured regardless of a communication aspect, such as wired communication and wireless communication, and may be configured by various communication networks. The network unit 150 according to an exemplary embodiment of the present disclosure may use an arbitrary type known wired/wireless communication systems.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The processor 110 according to an exemplary embodiment of the present disclosure may acquire state information including at least one state variable. In the present disclosure, the term "state information" may be interchangeably used with "information related to a system to be controlled". Each of one or more state variables included in the state information may corresponds to each of one or more observation values (that is, a measurement value) related to the system to be controlled. In some exemplary embodiments of the present disclosure, the system to be controlled related to the state information may be an "energy control system". The energy control system may be an energy control system for controlling an energy of buildings or vehicles.

FIG. 2 is an exemplary view conceptually illustrating some components for thermal exchange among components included in an energy control system. Components for thermal exchange included in the energy control system may include a control server (not illustrated), a measurement sensor (not illustrated), a pipe 210, a valve 230, a condenser 250, an evaporator 270, and a compressor 290.

The control server (not illustrated) of FIG. 2 exchanges an electric signal based on a wired/wireless communication method and controls or measures a plurality of other components included in the energy management system. As an example, the control server may be provided separately from the computing device 100 of the present disclosure and exchange information with the computing device 100 of the present disclosure. In this case, the control server includes a processor, a memory, and a network unit and receives a control signal according to a computation result of the computing device 100 to control the energy management system.

The measurement sensor (not illustrated) of FIG. 2 may be a sensor for measuring a specific observation value. For example, the measurement sensor may include a temperature sensor, a humidity sensor, an ultrasonic sensor, an accelerator sensor, an IR sensor, a time sensor, a current sensor, and a voltage sensor. The state variable included in the state information of the present disclosure may be calculated based on a sensor value acquired from one or more measurement sensors.

The pipe 210 may be a passage through which a heat transfer material (for example, water, cooling water, or a refrigerant solution) moves. The valve 230 may be a component which controls a flow rate of the heat transfer material which flows in the pipe. The condenser 250 may be a component which transforms a gaseous heat transfer material into a liquid state. The evaporator 270 may be a component which transforms a liquid heat transfer material into a gaseous state. The compressor 290 may be a component for compressing a low temperature and low pressure heat transfer material to make a high temperature and high pressure heat transfer material.

In the exemplary embodiment of the present disclosure, the processor 110 includes exemplary components (denoted by reference numerals 210 to 290) which have been described with reference to FIG. 2 to acquire state information from at least some of the plurality of components which configures the energy control system.

Each of at least one state variable included in the state information according to the present disclosure may be a physical quantity measured by a specific sensor. For example, the state information may include a state variable regarding temperature data. The temperature data may be observed by a thermometer at one arbitrary point on the energy control system. The state information may include a state variable regarding subcool data. In the present disclosure, the "subcool" is a physical quantity considered to control the energy control system. The subcool may be determined by a difference of a target theoretical condensing temperature and an actual measured temperature. The subcool may be a physical quantity referring to a difference between a theoretical condensing temperature at which phase transition from gas to liquid occurs when the gaseous heat transfer material passes through the condenser 250 and an actual measured temperature measured immediately before flowing a liquid state heat transfer material which is actually liquefied from the condenser 250 to the valve 230. The theoretical condensing temperature may be a condensing temperature of Morllier diagram or a P-H (pressure-enthalpy) diagram. The measured actual measured temperature may be a temperature value measured near a starting point of a valve which is drawn out from the condenser 250. The subcool is acquired from a calculate value of a theoretical condensing temperature and a measurement value of an actual measured temperature.

For example, the state information may include a state variable regarding compressor output data. For example, the compressor output data may be measured as a revolutions per minute (for example, RPM) of a propeller included in the compressor per unit time, a magnitude of a power applied to the compressor, or a magnitude of a voltage applied to the compressor. The state information may include a state variable regarding valve open/close data. The valve open/close data may be numerical data representing whether the valve is open/closed or numerical data representing how much the valve is open/closed, for example. The state information may include a state variable regarding heater output data. In this case, the heater may be a heater which heats the heat transfer material (for example, cooling water) which circulates the energy control system. The heater output data may be observed in the form of a magnitude of power or voltage applied to the heater used to heat the cooling water, for example.

The configuration which has been described above with reference to FIG. 2 is just an example for explaining a control target and state information of the present disclosure, but does not limit the present disclosure. The optimal control method according to the present disclosure may be applied to various systems which are controllable based on an observation value without being limited.

The state information acquired by the processor 110 according to the exemplary embodiment of the present disclosure may be state information acquired according to a previously determined time interval during the process of driving a vehicle. In the present disclosure, state information may be distinguished from each other according to an acquired timing. The predetermined time interval may be set in a minimum time unit for control, and for example, may be set to one second, ten seconds, or one minute. The processor 110 may acquire the state information at every timing that the previously determined time interval passes, from the vehicle internal energy system during the process of actually driving the vehicle. The processor 110 may calculate optimal control information based on a plurality of state information acquired according to a time interval which is previously determined during the process of actually driving the vehicle.

The processor 110 according to the exemplary embodiment of the present disclosure inputs state information to the reinforcement learning control model to calculate first control information. In the present disclosure, the term "first" or 'second" is used to distinguish one component from the other component and maintain the consistency of the indicated object as a whole in the specification, but the scope of the right is not limited by these terms. Accordingly, if necessary, "first control information" and "second information" may be changed to "second control information" and "first control information" and may be called while maintaining the consistency of the indicated object throughout the specification. The second control information calculated based on the feedback control algorithm will be described below in detail. Further, in some exemplary embodiments of the present disclosure, if there is no need to distinguish two or more control information for explanation, the "first control information" and the "second control information" may be commonly called "control information". The control information includes at least one control data among compressor output control data, valve open/close control data, or heater output control data, for example. For example, the processor 110 may manipulate the compressor output, how much open/close the valve, the heater output of the energy control system based on the control information including the compressor output control data, the valve open/close control data, and the heater output control data. One or more control data included in the control information may be an "independent variable" for manipulating the corresponding configuration in the energy control system. In the present disclosure, the term "control data" may be interchangeably used with the term "control variable".

In the present disclosure, "control information" and "state information" may be distinguished from each other with positions of the "independent variable" and the "dependent variable". Unlike the above-described control information, one or more state variable included in the state information may be a measurement value observed from one or more sensors included in the energy control system. Each state variable is a value observed as a result of manipulating the energy control system based on the control information and is understood as a 'dependent variable".

The reinforcement learning control model according to the present disclosure to calculate the first control information may operate based on the neural network. The reinforcement learning control model may have a structure including one or more neural network layers and each neural network layer may include at least one node. Hereinafter, a structure of a neural network included in the reinforcement learning control model will be described in detail with reference to FIG. 4.

FIG. 4 is a schematic diagram illustrating a network function according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more neural links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, a definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In the present disclosure, the "reinforcement learning control model" is an artificial neural network model which has a configuration of the neural network described above with reference to FIG. 4 and trained by the reinforcement learning method.

The reinforcement learning is a kind of learning methods which train the artificial neural network model based on a reward calculated for an action selected by the artificial neural network model to allow the artificial neural network model to determine a better action based on an input state. The reinforcement learning method is understood as "a learning method by means of trial and error" in that the decisions (that is, actions) are rewarded. During the reinforcement learning process, a reward given to the artificial neural network model may be a reward obtained by accumulating results of a plurality of actions. The reinforcement learning generates an artificial neural network model to maximize the reward or a return (a total of rewards) in consideration of various states and a reward according to the action through the learning. In the present disclosure, the "reinforcement learning control model" is a main agent which determines an action and is interchangeably used with the term "agent". In the technical field related to the reinforcement learning, a term, "environment (Env)" or "environment model", is used as a term denoting a "model which returns a result in consideration of an action of the agent". The environment model may be a model which returns output data (for example, state information) for given input data (for example, control information). The environment model may be a model whose model structure to reach to the output from the input or a causal relationship between input and output data has not been known. The agent and the environment exchange data therebetween to operate.

The environment model which interacts with the reinforcement learning control model of the present disclosure may be a model which generate state information related to an energy control system described above with reference to FIG. 2. The environment model of the present disclosure may include a model based on an actual environment (that is, an actual environment model) and a model based on a virtual environment (that is, a simulation model). The actual environment model and the simulation model may be distinguished depending on whether there is a physical system which generates state information. The actual environment model, for example, may be a physically existing energy system. When the physically existing energy system is an environment model, the processor 110 transmits control information to the energy system and then acquires state information based on a value acquired from one or more sensors included in the energy system. The simulation model is for example, a functional mock-up unit (FMU) model. The FMU model refers to a model following a functional mock-up interface (FMI) protocol and may be a model which returns the output to the input. The processor 110 transmits the control information to the FMU model and then acquires state information based on a value received from the FMU model. The actual environment model and the simulation model according to the present disclosure has a common point that the actual environment model and the simulation model are black box models that the output is generated for the input without having a knowledge of the causal relationship between the input and the output.

Hereinafter, a learning method of a reinforcement learning control model according to the present disclosure will be described in more detail with reference to FIG. 3. FIG. 3 is a conceptual view illustrating a simulation model and a reinforcement learning control model to explain a reinforcement learning method. The simulation model 330 is a main agent which returns the state information and the reward and is understood as an environment (env). The reinforcement learning control model 310 is a main agent which determines an active based on the state information and the reward and is understood as an agent. In the present disclosure, the state information includes current state information and next state information. The current state information and the next state information may be distinguished by a timing or an order that the corresponding state information is acquired and is referred to as current state information $S_t$ and next state information $S_{t+1}$ based on the order. The processor 110 according to the present disclosure generates training data to train the reinforcement learning control model based on a first exemplary embodiment regarding the following learning method.

In the first exemplary embodiment regarding a learning method according to the present disclosure, the simulation model 330 calculates "current state information $S_t$," which becomes a basis for the reinforcement learning control model 310 to determine an action. The processor 110 acquires current state information $S_t$ including at least one state variable from the simulation model 330 and then inputs the current state information to the reinforcement learning control model 310.

In the first exemplary embodiment regarding the learning method according to the present disclosure, the processor 110 inputs the current state information to the reinforcement learning control model 310, and then calculates first control information based on the reinforcement learning control model 310. The reinforcement learning control model 310 may calculate a probability distribution for a plurality of selectable actions (that is, the first control information) based on state information $S_t$ acquired from the simulation model 330 at an arbitrary timing t. The processor 110 calculates first control information $A_t$ based on the calculated probability distribution. For example, the processor 110 determines control information having a largest value among probability distributions for the plurality of control information, as first control information.

In the first exemplary embodiment regarding the learning method according to the present disclosure, the processor 110 inputs the first control information calculated based on the reinforcement learning control model 310 to the simulation model 330. The processor 110 acquires updated next state information $S_{t+1}$ and a reward $R_t$ from the simulation model 330 as an input result of the first control information. When a "reward function" which is a reference for the simulation model 330 to determine a reward or "transition probability distribution function" which is a reference for the simulation model 330 to determine next state information after receiving control information from the reinforcement learning control model 310 are known, the reinforcement learning is referred to as "model-based reinforcement learning". In contrast, when the reward function of the simulation model 330 and the transition probability distribution function of the simulation model 330 cannot be known, the reinforcement learning is referred to as "model-free" reinforcement learning.

The processor 110 according to the present disclosure generates training data based on at least a part of the first exemplary embodiment regarding the learning method as described above and trains the reinforcement learning control model 310 with at least one generated training data. For example, at least one generated training data includes current state information $S_t$, first control information $A_t$, a reward $R_t$, and next state information $S_{t+1}$.

The reinforcement learning control model according to the present disclosure is trained based on at least one episode. In the present disclosure, the "episode" is used to indicate a data sequence having a series of order. The episode may be a data set configured by a plurality of N-tuple data including N elements (N is a natural number of 1 or larger). The plurality of N-tuple data included in the episode may have a series of order. As an example of the N-tuple data, when N is 4, each 4-tuple data includes current state information, first control information, a reward, and next state information as elements. As another example of the N-tuple data, when N is 5, each 5-tuple data includes current state information, first control information corresponding to the current state information, a reward, next state information, and first control information corresponding to the next state information as elements.

The processor 110 according to the present disclosure repeats a plurality of steps which is the same as or similar to those of the first exemplary embodiment regarding the above-described learning method from the initial state (t=0) to a terminal state (t=T) to acquire one episode. The terminal state may be derived when a predetermined termination condition is satisfied or derived when a predetermined number of steps is performed. The step indicates at least one operation unit that the reinforcement learning control model receives a state, and determines an action and then receives a reward or updated state information for the action. The predetermined number of steps may be set to an arbitrary natural number, and for example, the steps may be configured by 200 steps.

The processor 110 acquires training data at every step included in the episode. For example, the processor 110 stores current state information $S_t$ acquired by the reinforcement learning control model from the environment, an action $A_t$ which is determined by the reinforcement learning control model based on the current state information, a reward $R_t$ acquired by the reinforcement learning control model from the environment as the result of the action, and next state information $S_{t+1}$ acquired by the reinforcement learning control model from the environment as the result of the action in the memory 130 in the form of a tuple of [current state information $S_t$, action $A_t$, reward $R_t$, and next state information $S_{t+1}$] as training data at an arbitrary timing. The action may be first control information. A timing t of the training data may proceed to a timing t+1 of the next state when updated state information is acquired from the environment as a result of an action determined by the reinforcement learning control model.

The processor 110 trains the reinforcement learning control model based on at least one training data. For example, the processor 110 trains the reinforcement learning control model based on the training data corresponding to each step whenever each step ends. As another example, the processor 110 learns the reinforcement learning control model based on a training data set including training data for each of the plurality of steps whenever each episode including the plurality of steps ends. As still another example, the processor 110 may learn the reinforcement learning control model based on a training data set including training data for each step after performing a step having a previously determined batch size. The batch size may be previously determined as an arbitrary natural number.

According to the present disclosure, the process of learning the reinforcement learning control model by the processor 110 includes a step of modifying each node weight or a deflection value of a neural network included in the reinforcement learning control model. The step of modifying each node weight or deflection value of the neural network included in the reinforcement learning control model is performed by the same or similar method to a backpropagation technique for a neural network described above with reference to FIG. 4, by the processor 110. For example, when a reward $R_t$ included in the training data T_t for an arbitrary timing t is a positive value, the processor 110 adjusts the weight or the deflection value of one or more nodes included in the reinforcement learning control model to reinforce the action $A_t$ included in the training data T_t. In this case, one or more nodes included in the reinforcement learning control model may be a node involved by the reinforcement learning control model to determine the action $A_t$ after receiving state information $S_t$ included in the training data T_t.

The specific description of the learning of the reinforcement learning control model described above are description for explanations, but does not limit the present disclosure. Even though in one exemplary embodiment of the learning method described with reference to FIG. 3, steps of training the reinforcement learning control model by the simulation model 330 which is a virtual environment model have been described, the actual environment model also has the same input/output relationship as the virtual environment model so that the reinforcement learning control model according to the present disclosure is also trained by the actual environment model.

The trained reinforcement learning control model 310 determines an action in the state information to maximize the accumulated value (that is, return) of the rewards given from the simulation model 330. A method of determining an action by the reinforcement learning control model 310 may be based on at least one of a value-based action determining method, a policy-based action determining method, and a value and policy based action determining method for example. The value-based action determining method is a method for determining an action which gives a best value in each state based on a value function. Examples of the value based action determining method include Q-learning and a deep Q-network DQN. The policy-based action determining method is a method of determining an action based on a final return and a policy function without a value function. An example of the policy-based action determining method incudes a policy gradient technique. The value-and-policy based action determining method is a method of determining an action of an agent by learning such that when a policy function determines an action, a value function evaluates an action. The value-and-policy based action determining method includes an actor-critic algorithm, a soft actor-critic algorithm, an A2C algorithm, and an A3C algorithm for example.

The processor 110 according to an exemplary embodiment of the present disclosure calculates second control information from state information based on a feedback control algorithm. The processor 110 computes the acquired state information using a feedback control algorithm to calculate second control information. The second control information is configured by control data which is the same as or similar to first control information calculated by the reinforcement learning control model. The second control information includes at least one control data among compressor output control data, valve open/close control data, or heater output control data for example. The feedback control algorithm of the present disclosure is based on a proportional integral differential (PID) control algorithm. The PID control may be represented by Equation 1.

$$\text{output} = K_p e + K_I \int e\, dt + K_D \frac{de}{dt} \quad \text{[Equation 1]}$$

In Equation 1, $K_p$ indicates a proportional gain constant (that is, a proportional gain). $K_I$ indicates an integral gain constant (that is, an integral gain). $K_D$ indicates a differential gain constant (that is, a differential gain). $e_e$ indicates an error (that is, a difference between a target value of a physical amount to be controlled and a current value). The PID control algorithm represented by Equation 1 may be an algorithm which collects a proportional component, an integral component, and a differential component for the error to calculate a control value. As represented in Equation 1, the processor 110 adds a proportional component $K_p e$ acquired by multiplying a proportional gain constant to the error, an integral component $K_I \int dt$ acquired by multiplying an integral gain constant to an integrated value of the error according to the time, and a differential component $K_D de/dt$ obtained by multiplying a differential gain constant to a differential value of the error according to the time to calculate an output value for controlling a control target. The feedback control algorithm of the present disclosure may be based on the proportional (P) control algorithm or a proportional-integral (PI) control algorithm. The proportional control algorithm is an algorithm which calculates a control value of a control target using the proportional component in Equation 1. The proportional-integral (PI) control algorithm is an algorithm which calculates a control value of the control target using a proportional component and an integral component in Equation 1.

The processor 110 according to the present disclosure calculates optimal control information based on first control information and second control information. As described above, the first control information is information calculated from state information by a reinforcement learning control model and the second control information is information calculated from state information based on a feedback control algorithm. In the present disclosure, "optimal control information" may be control information which is actually determined to perform the control based on the first control information and the second control information by the processor 110.

In the first exemplary embodiment regarding the optimal control information calculation according to the present disclosure, the processor 110 may calculate the optimal control information by determining one of the first control information and the second control information as optimal control information according to the set determining condition. The set determining condition may be a condition based on an error of the first control information and the second control information and a previously determined error threshold. For example, the error of the first control information and the second control information is included in each of the first control information and the second control information and is based on a mean of the errors between one or more control variables corresponding to each other. For example, it is assumed that one or more control variables included in the first control information are denoted by A1, B1, C1, and D1 and one or more control variables included in the second control information are denoted by A2, B2, C2, and D2. In this case, the error of the first control information and the second control information is determined by a mean value of a "difference of A1 and A2, a "difference of B1 and B2", a "difference of C1 and C2", and a "difference of D1 and D2". The previously determined error threshold is a value for serving as an upper limit of the error of the first control information and the second control information and is determined as an arbitrary real number. Hereinafter, a first exemplary embodiment regarding optimal control information calculation according to the present disclosure will be described with reference to FIG. 5.

FIG. 5 is an exemplary view conceptually illustrating a variance of one control variable included in first control information and second control information over a time, according to an exemplary embodiment of the present disclosure. In the graph of FIG. 5, an x-axis is a time axis. In the graph of FIG. 5, a y axis represents an arbitrary control variable included in the control information. For example, the y axis of FIG. 5 may represent a current output of a compressor or a heater or an opening/closing level of the valve.

Solid line graphs illustrated in FIG. 5 represent a change of the control variable according to the time when the control target system is controlled using the first control information calculated from the reinforcement learning control model. End points 511, 531, and 551 of the solid line graphs represent control variable values corresponding to a last timing in each time interval. In FIG. 5, end points of the solid line graphs may be simply referred to as a 1-1-st control variable 511, a 1-2-nd control variable 531, and a 1-3-rd control variable 551 according to a time sequence.

Dotted line graphs illustrated in FIG. 5 represent a change of the control variable according to the time when the control target system is controlled using the second control information calculated based on the feedback control algorithm. End points 513, 533, and 553 of the dotted line graphs represent control variables corresponding to a last timing in each time interval. In FIG. 5, end points of the dotted line graphs may be simply referred to as a 2-1-st control variable 513, a 2-2-nd control variable 533, and a 2-3-rd control variable 553 according to a time sequence.

The processor 110 calculates an error of the first control information and the second control information at every time interval and compares the calculated error with a predetermined error threshold to calculate final control information. The reference numeral 570 of FIG. 5 denotes a segment which conceptually illustrates a previously determined error threshold. For example, the processor 110 calculates an error of the 1-1-st control variable 511 and the 2-1-st control variable 513 and compares the error with a predetermined error threshold 570 to select one of the 1-1-st control variable 511 and the 2-1-st control variable 513 as a first final control variable, at a first timing. In FIG. 5, the difference between the 1-1-st control variable 511 and the 2-1-st control variable 513 is larger than the previously determined error threshold 570 so that the processor 110 may select the 2-1-st control variable 513. The processor 110 calculates an error of the 1-2-nd control variable 531 and the 2-2-nd control variable 533 and compares the error with a predetermined error threshold 570 to select one of the 1-2-nd control variable 531 and the 2-2-nd control variable 533 as a final control variable, at a second timing after the first timing. Further, the processor 110 selects one of the 1-3-rd control variable 551 and the 2-3-rd control variable 553 as a final control variable, at a third timing after the second timing.

The first exemplary embodiment regarding the final control information calculation described with reference to FIG. 5 is just specific description for explaining, but the specific description does not limit the present disclosure. The present disclosure includes various exemplary embodiments for determining one control information of two control information as final control information by comparing an error between the control information based on the reinforcement learning control model and control information based on the feedback based algorithm and an error threshold, without any limitation.

According to the first exemplary embodiment regarding the optimal control information calculation of the present disclosure, the processor 110 performs the control based on the reinforcement learning control model and sets an upper limit for a difference from the PID control of the related art. By doing this, the reinforcement learning based control with an improved efficiency may be performed within a threshold error with the PID control in each part while guaranteeing at least the performance of the PID control from the overall point of view. Basically, the reinforcement learning based control is control according to a result of "learning the related data" so that it has a higher efficiency than the simple feedback control. However, in view of the "training data", when data different from the learned data is input to the computing device 100, there may be a risk that the processor 110 may perform manipulation which is not expected by the user. Accordingly, the first exemplary embodiment regarding the optimal control information calculation of the present disclosure discloses a method for achieving an optimal efficiency by performing the control based on the reinforcement learning control model in each time interval while preventing unexpected manipulation as a whole by setting a maximum value of the difference from the PID control of the related art.

In some exemplary embodiments of the present disclosure, the processor 110 may calculate the optimal control information based on a result of a weighted sum operation based on the first control information and the second control information.

According to a second exemplary embodiment regarding optimal control information calculation according to the present disclosure, the processor 110 performs weighted sum operation based on the first control information and the second control information using a previously determined weight corresponding to each control information. The processor 110 may perform weighted sum operation using a "first weight" which corresponds to the first control information and is previously determined and a "second weight" which corresponds to the second control information and is previously determined. The first weight and the second weight are set by appropriate real numbers to make the sum 1. The first weight and the second weight may be set by the processor 110 to be appropriate real numbers to form an appropriate rate between two values. The processor 110 receives values for the first weight and the second weight from an external server through the network unit 150 to set the weights. Further, the processor 110 directly receives the first weight and the second weight from the user through an input unit (not illustrated) included in the computing device 100 to set the weights.

In the second exemplary embodiment, the processor 110 sets the first weight corresponding to the first control information to be "0.1" and the second weight corresponding to the second control information to be "0.9". In this case, a ratio of the first weight corresponding to the first control information and the second weight corresponding to the second control information is 1:9, which may be a weight value set with a low reliability of the first control information based on the reinforcement learning control model since the learning of the reinforcement learning control model has not progressed so much. As another example, the processor 110 sets the first weight corresponding to the first control information to be "0.8" and the second weight corresponding to the second control information to be "0.2". In this case, a ratio of the first weight corresponding to the first control information and the second weight corresponding to the second control information is 4:1, which may be a weight value set with a high reliability of the first control information calculated based on the reinforcement learning control model since the learning of the reinforcement learning control model has smoothly progressed. In addition to the above-described exemplary description, the first weight and the second weight may be set as various values to have a predetermined ratio.

According to the second exemplary embodiment regarding the optimal control information calculation, the processor 110 multiplies the previously determined first weight and the first control information to obtain reinforcement learning based control information related component and multiply the previously determined second weight and the second control information to acquire a feedback control algorithm based control information related component. Thereafter, the processor 110 adds the reinforcement learning based control information related component and the feedback control algorithm based control information related component to calculate the optimal control information.

According to the second exemplary embodiment regarding the optimal control information calculation of the present disclosure, the processor 110 considers both the first control information and the second control information derived as the result of using various types of algorithms, but reflects each control information at an appropriate ratio to calculate the optimal control information. By doing this, the feedback control method (for example, the PID control) which has a low sensitivity to the input data to enable stable control and the reinforcement learning based control method which enables the optimal control for the efficiency when the training data is input are appropriately mixed to calculate the final control information.

The processor 110 according to the present disclosure calculates optimal control information based on first control information and second control information based on a confidence score calculated by the reinforcement learning control model. In the present disclosure, the "confidence score" calculated by the reinforcement learning control model is a reliability score which is calculated together with the first control information when the reinforcement learning control model calculates the first control information. The reinforcement learning control model having a neural network structure is trained based on the finally calculated confidence score. Further, the reinforcement learning control model calculates the control information which is calculated even in the inferring process and the confidence score for the control information.

The processor 110 calculate the optimal control information based on the first control information and the second control information by significantly reflecting the first control information as the confidence score calculated by the reinforcement learning control model is higher. Hereinafter, the optimal control method based on the confidence score calculated by the reinforcement learning control model will be described in more detail by means of the description of the third exemplary embodiment.

According to the third exemplary embodiment regarding optimal control information calculation according to the present disclosure, the processor 110 performs weighted sum operation based on the first control information and the second control information and determines a weight for the weighted sum operation according to the confidence score calculated by the reinforcement learning control model.

As an example of the third exemplary embodiment, the processor 110 sets the confidence score calculated by the reinforcement learning control model to a first weight corresponding to the first control information. For example, when the range of the confidence score calculated by the reinforcement learning control model is equal to or higher than 0 and equal to or lower than 1, the processor 110 may use the confidence value as it is to assign a higher weight to the first control information as the confidence score is higher. The processor 110 calculates the optimal control information by setting the weight corresponding to the first control information to a "confidence score" and setting the weight corresponding to the second control information to "1-confidence score". As another example, even though the range of the confidence score calculated by the reinforcement learning control model is not equal to or higher than 0 and not equal to or lower than 1, the processor 110 converts (for example, scales) the range of the confidence score calculated by the reinforcement learning control model into a range of [0, 1] and sets the weights corresponding to the first control information and the second control information based thereon.

As another example of the third exemplary embodiment, the processor 110 sets the weight for the weighted sum operation such that the higher the confidence score calculated by the reinforcement learning control model, the higher the ratio which is obtained by dividing the first weight corresponding to the first control information by the second weight corresponding to the second control information. A reflected ratio of the first control information and the second control information for calculating the optimal control information may be substantially represented by the ratio of the first weight and the second weight. The processor 110 may set the weight such that the higher the confidence score calculated by the reinforcement learning control model, the higher the ratio obtained by dividing the first weight by the second weight. The processor 110 sets a plurality of intervals (for example, [0, 0.3], [0.3, 0.5], [0.5, 0.9], or [0.9, 1]) for the confidence score calculated by the reinforcement learning control model and determines a ratio of the first weight and the second weight, the first weight value, and the second weight value according to the confidence score calculated by the reinforcement learning control model at each control timing. Hereinafter, a third exemplary embodiment regarding optimal control information calculation according to the present disclosure will be described with reference to FIG. 6.

FIG. 6 is an exemplary view conceptually illustrating a variance of one control variable included in first control information and second control information over a time, according to an exemplary embodiment of the present disclosure. An x axis and a y axis of FIG. 6 may be described to be similar to FIG. 5. The x axis of FIG. 6 is a time axis and the y axis is an arbitrary control variable (for example, an output of a compressor) included in the control information.

Similarly to FIG. 5, solid line graphs illustrated in FIG. 6 represent a change of the control variable according to the time when the control target system is controlled using the first control information calculated from the reinforcement learning control model. End points 611, 631, and 651 of the solid line graphs represent control variable values corresponding to a last timing in each time interval. End points 611, 631, and 651 of the solid line graphs may be simply referred to as a 1-1-st control variable 611, a 1-2-nd control variable 631, and a 1-3-rd control variable 651 according to a time sequence.

Similarly to FIG. 5, dotted line graphs illustrated in FIG. 6 represent a change of the control variable according to the time when the control target system is controlled using the second control information calculated based on the feedback control algorithm. End points 613, 633, and 653 of the dotted line graphs represent control variable values corresponding to a last timing in each time interval. In FIG. 6, end points of the dotted line graphs may be simply referred to as a 2-1-st control variable 613, a 2-2-nd control variable 633, and a 2-3-rd control variable 653 according to a time sequence.

At the first timing, the processor 110 calculates a weighted sum of the 1-1-st control variable 611 and the 2-1-st control variable 613 to calculate the first final control variable 615. In this case, the confidence score which is calculated from the reinforcement learning control model together with the 1-1-st control variable 611 has a low value so that the processor 110 sets a ratio of the first weight and the second weight to determine the first final control variable to be closer to the 2-1-st control variable. Even after the first timing, the processor 110 may continuously calculate the control variable according to the time based on the reinforcement learning control model and the feedback control algorithm.

At the second timing, the processor 110 calculates a weighted sum of the 1-2-nd control variable 631 and the 2-2-nd control variable 633 to calculate the second final control variable 635. Even in this case, the processor 110 may set the weight to allow the second final control variable 635 to have a value closer to the 2-2-nd control variable 633 based on the confidence score calculated by the reinforcement learning control model together with the 1-2-nd control variable 631.

At the third timing, the processor 110 calculates a weighted sum of the 1-3-rd control variable 651 and the 2-3-rd control variable 653 to calculate the third final control variable. In this case, when the confidence score calculated by the reinforcement learning control model has a value close to 1, the processor 110 determines the third final control variable with the 2-3-rd control variable 653 as it is or a value approximate to the 2-3-rd control variable 653 and consistently controls the control target system.

The description described above with reference to FIG. 6 is just description for explanations, but does not limit the present disclosure and the third exemplary embodiment according to the present disclosure includes various exemplary embodiments for determining a weight corresponding to the first control information and a weight corresponding to the second control information for weighted sum operation based on the confidence score calculated by the reinforcement learning control model without being limited.

Hereinafter, prior to description of some exemplary embodiments regarding the optimal control information calculation according to the present disclosure, a "dynamic model" for determining a sample similarity of state information including at least one state variable will be described.

In the present disclosure, the term "dynamic model" may refer to a model for simulating an operation of an environment model which interacts with the reinforcement learning control model. The dynamic model may be a model for simulating an operation of an actual environment model or a simulation model. The dynamic model may be a set of data for the processor 110 to have a predetermined computation order at least partially based thereon to generate output data for the given input data. The set of the data which may be included in the dynamic model may include a set of nodes for configuring a neural network and a set of nodes for configuring a decision tree, for example. For example, the dynamic model may be a model configured by a plurality of decision trees. As another example, the dynamic model may be a neural network based model as described above with reference to FIG. 4. Further, the dynamic model may be a recurrent neural network (RNN) or a long short term memory (LSTM) model to consider a causal relationship of time-series data. In the present disclosure, the actual environment model and the simulation model do not know the casual relationship between the input data and the output data, but simply derives an output corresponding to a given input. In contrast, the dynamic model according to the present disclosure is "a data set which is trainable" to output predicted state information (that is, state information of a next timing) by inputting state information and control information and learns the causal relationship between the input data and the output data, which is distinguished from the actual environment model and the simulation model.

The input data of the dynamic model includes state information including at least one state variable and control information including at least one control data. Specific examples of the state information and the control information have been described above so that the redundant description will be omitted. The output data of the dynamic model includes predicted state information. In the present disclosure, the "predicted state information" may be the same type of data as the state information. The predicted state information included in the output data of the dynamic model may correspond to a timing later than a timing corresponding to the state information included in the input data. The dynamic model predicts the current state information and next state information in consideration of the control information of the reinforcement learning control model for the current state information and outputs the predicted next state information as "predicted state information". That is, the dynamic model according to the present disclosure receives the current state information and the control information as inputs to output predicted state information which predicts next state information.

The dynamic model according to the present disclosure may be trained based on the simulation model (for example, an FMU model) corresponding to a virtual environment model. The simulation model has been described above with reference to FIG. 3 so that the redundant description will be omitted. The dynamic model may be supervised learning because there is correct answer data (next state information) of the output data (for example, predicted state information) for the input data (for example, current state information and control information). In the case of the supervised learning, the learning may be progressed using training data (that is, labeled training data) labeled with correct answer. For example, when the training data labeled with correct answer is input to the dynamic model, the output (predicted state information) of the dynamic model and the label (next state information) of the training data are compared to calculate an error. Hereinafter, an exemplary embodiment of training a dynamic model using the reinforcement learning control model according to the present disclosure and the simulation model will be described in more detail.

In the exemplary embodiment of training a dynamic model of the present disclosure, the processor 110 acquires current state information $S_t$ including at least one state variable from the simulation model. The simulation model does not know the correlation of the input and the output so that it is treated as a black box. The processor 110 inputs the current state information $S_t$ acquired from the simulation model to the reinforcement learning control model and acquires control information $A_t$ from the reinforcement learning control model. The reinforcement learning control model may be a neural network in which the learning is completed to calculate the control information $A_t$ by receiving the current state information $S_t$ or a neural network which is trained together with the dynamic model. The processor 110 inputs the current state information $S_t$ acquired from the simulation model and the control information $A_t$ acquired from the reinforcement learning control model to the dynamic model and acquires predicted state information $S'_{t+1}$ from the dynamic model as an input result.

The processor 110 returns the control information $A_t$ to the simulation model to acquire the next state information $S_{t+1}$ from the simulation model. The processor 110 compares the predicted state information S't+1 and the next state information $S_{t+1}$ to train the dynamic model. For example, the processor 110 perform supervised learning on the dynamic model to allow the dynamic model to predict the next state information from the current state information well using an algorithm which back-propagates the error of the predicted state information S't+1 and the next state information $S_{t+1}$ to the dynamic model. As an example of the error of the predicted state information and the next state information, the processor 110 calculates the error based on a difference between corresponding state variable pair among one or more state variables included in the predicted state information and the next state information. For example, it is assumed that state variables included in the next state information are expressed as $a_t$, $b_t$, $c_t$, and $d_t$ and state variables included in the predicted state information are expressed as $a'_t$, $b'_t$, $c'_t$, and $d'_t$. In this case, the error may be determined based on a mean value of a difference of $a_t$ and $a'_t$, a difference of b and $b'_t$, a difference of c, and $c'_t$, and a difference of $d_t$ and $d'_t$.

The processor 110 according to the exemplary embodiment of the present disclosure determines a sample similarity for the state information using the trained dynamic model. In the present disclosure, the "sample similarity" of the state information may be an index representing a similar degree between training data used during a process in which the reinforcement learning control model is trained and data acquired during an inferring process in which the reinforcement learning control model is actually used. State information which is a target from which the sample similarity is determined by the processor 110 may be state information acquired from the actual environment, rather than the training data. The processor 110 may determine the sample similarity based on the acquired state information and the predicted state information calculated based on the dynamic model. For a detailed description, it is assumed that the processor 110 sequentially acquires state information $S_{t-1}$ at a timing t-1 and state information $S_t$ at a timing t according to the time sequence. In this case, the processor 110 may also acquire the control information $A_{t-1}$ for the state information $S_{t-1}$ at the timing t-1 from the reinforcement learning control model. The processor 110 acquires predicted state information S'$_t$ at the timing t from the dynamic model based on the state information $S_{t-1}$ of the timing t-1 and control information $A_{t-1}$ therefor. The processor 110 acquires the state information $S_t$ of the timing t and compares the predicted state information S'$_t$ and the state information $S_t$ of the timing t to determine the sample similarity.

The larger the error calculated between the state information and the predicted state information, the smaller the sample similarity is determined within the previously determined similarity range by the processor 110 according to the present disclosure. For example, the previously determined similarity range for the sample similarity may be [0, 1]. When the error of the state information and the predicted state information is "0", the processor 110 may determine the sample similarity to be "1". When the error of the state information and the predicted state information exceeds a threshold (for example, 10), the processor 110 may determine the sample similarity to be "0". The processor 110 may determine the sample similarity as a value close to "0" as the error of the state information and the predicted state information is closer to the threshold.

In some exemplary embodiments of the present disclosure, the processor 110 may calculate the optimal control information based on the first control information, the second control information, and the sample similarity calculated by the dynamic model. Hereinafter, a fourth exemplary embodiment in which the processor 110 calculates optimal control information based on the dynamic model according to the present disclosure will be described in more detail.

In the fourth exemplary embodiment regarding the optimal control information calculation, the processor 110 calculates optimal control information according to a result of a weighted sum operation based on the first control information, the second control information, and the sample similarity. The processor 110 may determine a weight required for the weighted sum operation based on the sample similarity. The processor 110 may determine weights each corresponding to the first control information and the second control information based on the sample similarity. The processor 110 performs the weighted sum operation according to the determined weight and calculates the optimal control information. For example, when a previously determined similarity range for the sample similarity is [0, 1] and the sample similarity calculated by the dynamic model is 0.7, the processor 110 sets a first weight for the first control information calculated by the reinforcement learning control model to 0.7 and a second weight for the second control information based on the feedback control algorithm to 0.3 to calculate final control information.

The processor 110 may set the weights such that the higher the sample similarity, the higher the ratio obtained by dividing the first weight corresponding to the first control information by the second weight corresponding to the second control information. For example, when a previously determined similarity range for the sample similarity is [0, 1] and the sample similarity calculated by the dynamic model is 1, the processor 110 determines the first weight and the second weight such that a ratio value obtained by dividing the first weight by the second weight has a large value such as infinity. As another example, when a previously determined similarity range for the sample similarity is [0, 1] and the sample similarity calculated by the dynamic model is 0 or a value close to 0, the processor 110 determines the first weight and the second weight such that a ratio value obtained by dividing the first weight by the second weight has a small value such as 0.

The operation of calculating the final control information at every timing in the contents described above with reference to FIG. 6 may be described in the fourth exemplary embodiment regarding the optimal control information calculation in the similar manner. Referring to FIG. 6 again, the processor 110 calculates a weighted sum of the 1-1-st control variable 611 and a 2-1-st control variable 613 at the first timing to calculate the first final control variable 615. However, in this case, the weight for the weighted sum may be set based on the sample similarity calculated based on the predicted state information calculated by the dynamic model, rather than the confidence score of the reinforcement learning control model. When the weighted sum of the first control variable and the second control variable is calculated at a plurality of different timings to determine the final control variable, the processor 110 may determine the weight corresponding to each control variable based on the sample similarity.

According to the fourth exemplary embodiment for final control information calculation of the present disclosure, when the processor 110 derives the sample similarity based on the predicted state information calculated by the dynamic model and reflects the derived sample similarity to the weighted sum operation, the processor 110 may determine the weight using a separate supervised-learned model in addition to the confidence score calculated by the reinforcement learning control model which is a learning target. The sample similarity according to the present disclosure is not an index (for example, the confidence score of the reinforcement learning model) in which a similar degree between newly input data and previously trained training data is implicatively reflected, but is an index of directly calculating a similar degree with the previously trained training data so that it is advantageous in that a reflection ratio between the control information according to the feedback control algorithm and the control information according to the reinforcement learning is more conservatively determined. Further, when the dynamic model according to the present disclosure is used, a model which simulates the actual environment or the virtual environment is generated so that it is advantageous in that the reinforcement learning control model may be trained by off-line using the dynamic model.

According to an exemplary embodiment of the present disclosure, the processor 110 may consistently train the reinforcement learning control model based on two or more state information acquired along the time interval which is previously determined during a process of driving a vehicle. The processor 110 calculates optimal control information based on the reinforcement learning control model which has been previously trained during the process of driving the actual vehicle and drives an in-vehicle energy system. A plurality of state information acquired as a result of driving the actual vehicle based on the previously trained reinforcement learning control model may be treated as new training data. The processor 110 may consistently train the reinforcement learning control model based on two or more state information acquired during the process of driving the actual vehicle. For example, the processor 110 performs the transfer learning on the reinforcement learning control model to consistently train the reinforcement learning control model. After setting a parameter of the neural network included in the reinforcement learning control model in the current state as an initial parameter value, the processor 110 trains the reinforcement learning control model using two or more state information acquired during the process of driving the vehicle as training data. As another example, the processor 110 may consistently train the reinforcement learning control model by retraining the reinforcement learning control model. After setting a parameter of the neural network included in the reinforcement learning control model as an arbitrary initial parameter value, the processor 110 trains the reinforcement learning control model using two or more state information acquired during the process of driving the vehicle as training data. As described above, when the reinforcement learning control model is consistently trained based on the state information acquired during the process of driving the vehicle, a feature of an actual physical environment which is not implemented by the simulation model is trained to achieve a higher efficiency during the actual vehicle driving.

The dynamic model according to the present disclosure may be consistently trained based on two or more state information acquired according to a time interval previously determined during the process of driving the vehicle. The processor 110 consistently trains the dynamic model to allow the dynamic model to calculate "predicted state information" which more accurately predicts the next state information using the state information acquired during the process of driving the actual vehicle. A specific method of the consistent learning may be the same as or similar to the above-described consistent learning method of the reinforcement learning control model.

The processor 110 according to the present disclosure may consistently train the reinforcement learning control model using the consistently trained dynamic model. When the reinforcement learning control model is consistently trained using the consistently trained dynamic mode according to the exemplary embodiment of the present disclosure, the following advantages may be obtained. As described with reference to FIG. 3, in order to perform the reinforcement learning on the agent, an environment model for reacting the action is essentially requested. In this case, when an "internal operation process from input to output" of the environment model is known, it is referred to as "model-based reinforcement learning" and when the "internal operation process from input to output" of the environment model is not known, it is referred to as "model-free reinforcement learning". In the meantime, the actual physical world is not easily modeled and generally, as a system has a higher complexity, the model-free reinforcement learning may be proceeded. In this case, in the case of model-free reinforcement learning, numerous iterations may be required to obtain training data (for example, episode data). Further, when the environment model used for the model-free reinforcement learning does not immediately respond to the input, obtaining training data may be inevitably limited by the requested time. In contrast, according to the present disclosure, when a separate model (that is, a dynamic model) for simulating an operation of the environment model (that is, a simulation model) used for the model-free reinforcement learning is generated, the processor 110 has an advantage of proceeding the reinforcement learning without being restricted by the training data generating time. Further, when an agent which is a target of the reinforcement learning is an energy system for a vehicle, if the dynamic model is used, the agent may be trained without driving the actual vehicle so that the resources may be saved. The processor 110 according to the present disclosure may train the reinforcement learning control model by replacing the "simulation model" used for the learning with the "dynamic model" which is consistently trained, during the process of training the reinforcement learning control model described above with reference to FIG. 3.

FIG. 7 is a flowchart illustrating a process of calculating optimal control information based on a reinforcement learning control model and a feedback control algorithm by a processor, according to an exemplary embodiment of the present disclosure. The processor 110 according to the present disclosure may acquire state information including at least one state variable in step S510. The state information may include at least one state variable regarding the energy control system. At least one state variable may include temperature data, subcool data, compressor output data, valve open/close data, or heater output data, for example. When the reinforcement learning control model is in the learning process, the processor 110 may acquire state information from the simulation model. When the reinforcement learning control model is in an actual operation process (that is, an inference process), the processor 110 may acquire state information from an external environment or the external server. The processor 110 inputs the state information to the reinforcement learning control model to calculate the first control information in step S530. The reinforcement learning control model includes a neural network structure and is trained such that state information is input to output control information. The control information includes at least one control data among compressor output control data, valve open/close control data, or heater output control data, for example. The processor 110 calculates the second control information from the state information based on the feedback control algorithm in step S550. The feedback control algorithm includes the PID control algorithm. The processor 110 calculates optimal control information based on first control information and second control information. The processor 110 calculates the optimal control information by selecting one of first control information and second control information. The processor 110 calculates optimal control information based on a weighted sum operation of the first control information and the second control information. The processor 110 calculates the optimal control information by weighted sum of the first control information and the second control information based on the confidence score calculated by the reinforcement learning control model.

FIG. 8 is a flowchart illustrating a process of training a reinforcement learning control model by a processor according to an exemplary embodiment of the present disclosure. The processor 110 acquires current state information $S_t$ including at least one state variable from the simulation model in step S610. The simulation model may be a model which calculates "current state information" which is information for the reinforcement learning control model to determine an action. The processor 110 may input the current state information to the reinforcement learning control model in step S630. As a result of the input, the processor 110 calculate the first control information based on the output of the reinforcement learning control model in step S650. The reinforcement learning control model may compute a probability distribution regarding a plurality of selectable actions based on the current state information $S_t$ at the timing t acquired from the simulation model. The processor 110 calculates first control information $A_t$ based on the computed probability distribution. The processor 110 may input the calculated first control information to the simulation model in step S670. The processor 110 acquires updated next state information $S_{t+1}$ and a reward $R_t$ from the simulation model as an input result of the first control information in step S690. In the present disclosure, the simulation model may be an external model whose internal operation process is not open. Specifically, the code for the internal operation process of the simulation model is encapsulated so as not to be open. The processor 110 repeatedly performs the above-described steps S610 to S690 to generate episode data for training the reinforcement learning control model.

FIG. 9 is a flowchart illustrating a process of calculating optimal control information based on a reinforcement learning control model and a feedback control algorithm, and further based on a dynamic model, by a processor, according to an exemplary embodiment of the present disclosure. The processor 110 may acquire state information including at least one state variable in step S710. The processor 110 inputs the state information to the reinforcement learning control model to calculate the first control information in step S730. The processor 110 calculates the second control information from the state information based on the feedback control algorithm in step S750. Steps S710 to S750 are performed by the processor 110 in a similar manner to steps S510 to S530 described above with reference to FIG. 7. The processor 110 may determine a sample similarity of the state information using the trained dynamic model in step S770. The dynamic model may be a model which receives the current state information to derive a predicted value for next state information. The dynamic model may be configured with a data structure of a decision tree or a neural network. The processor 110 inputs the state information of the timing t−1 and the control information of the reinforcement learning control model for the state information of the timing t−1 to the dynamic model to acquire predicted state information for the state information of the timing t. The processor 110 may determine a sample similarity between the state information of the timing t acquired from the environment model and the predicted state information for the state information of the timing t acquired from the dynamic model. The sample similarity may be an index which reflects the similar degree between the state information of the timing t and the predicted state information for the state information of the timing t. The processor 110 may calculate optimal control information based on the first control information, the second control information, and the determined sample similarity in step S790. The processor 110 may calculate the optimal control information by assigning a higher weight to the first control information as the sample similarity is higher. For example, a sum of the first weight and the second weight corresponding to the first control information and the second control information, respectively may be 1. The processor 110 may set the values of the first weight and the second weight to values between 0 and 1 by considering the calculated sample similarity. For example, as the sample similarity calculated based on the output of the dynamic model is close to the maximum value, the processor 110 may set the first weight to "1" and the second weight to "0". As another example, as the calculated sample similarity is close to the minimum value, the processor 110 may set the first weight to "0" and the second weight to "1".

FIG. 10 is a flowchart illustrating a process of training a dynamic model by a processor according to an exemplary embodiment of the present disclosure. The processor 110 acquires current state information $S_t$ including at least one state variable from the simulation model in step S810. The simulation model does not know the correlation of the input and the output so that it is treated as a black box. The processor 110 inputs the current state information $S_t$ acquired from the simulation model to the reinforcement learning control model and acquires control information $A_t$ from the reinforcement learning control model in step S820. The processor 110 may input the current state information $S_t$ and the control information $A_t$ to the dynamic model in step s830. The processor 110 may acquire predicted state information S't+1 from the dynamic model in step s840. The predicted state information S't+1 may be a predicted value about the next state information to be acquired from the simulation model when the processor 110 inputs control information $A_t$ to the simulation model as a response to the current state information $S_t$. The processor 110 may acquire the next state information S't+1 by inputting the control information $A_t$ to the simulation model as a response to the current state information $S_t$ in step S850. The processor 110 back-propagates the error by comparing the predicted state information S't+1 and the next state information $S_{t+1}$ in step S860 to train the dynamic model. As the training of the dynamic model is progressed, the error of predicted state information S't+1 and the next state information $S_{t+1}$ may be reduced.

FIG. 11 is a simple and general schematic diagram illustrating an example of a computing environment in which the embodiments of the present disclosure are implementable. The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

The invention claimed is:

1. A dynamic model based optimal control method performed by a computing device including at least one processor, the dynamic model based optimal control method comprising:
  acquiring state information including at least one state variable from one or more physical sensors of a vehicle thermal-management system, the state information comprising sensor signals representing temperature, subcool, compressor output, valve position, or heater output, wherein the state information is sampled at a previously determined fixed time interval during a process of driving the vehicle;
  calculating first control information by inputting the state information to a reinforcement learning control model;
  calculating second control information from the state information based on a feedback control algorithm comprising a proportional-integral-differential (PID) control loop acting on a vehicle-cabin temperature error;
  determining a sample similarity of the state information using a trained dynamic model;
  calculating optimal control information based on the first control information, the second control information, and the sample similarity; and
  executing the optimal control information by generating and transmitting drive signals to at least one actuator of the vehicle thermal-management system, wherein the actuator comprises a compressor drive, an electronic expansion valve, or an electric heater, thereby physically changing the state of refrigerant or air in the vehicle.

2. The dynamic model based optimal control method according to claim 1, wherein the state information is acquired according to a previously determined time interval during a process of driving a vehicle.

3. The dynamic model based optimal control method according to claim 1, wherein the state information includes at least one state variable regarding temperature data, subcool data, compressor output data, valve open/close data, or heater output data.

4. The dynamic model based optimal control method according to claim 1, wherein the dynamic model is a model for simulating an operation of an environment model,
  input data of the dynamic model includes state information and control information, and
  output data of the dynamic model incudes predicted state information.

5. The dynamic model based optimal control method according to claim 4, wherein the predicted state information included in the output data corresponds to a timing later than a timing corresponding to state information included in the input data.

6. The dynamic model based optimal control method according to claim 1, wherein the dynamic model is trained based on a simulation model which trains the reinforcement learning control model.

7. The dynamic model based optimal control method according to claim 6, wherein the dynamic model is trained based on a learning method including:
  acquiring current state information including at least one state variable from a simulation model;
  acquiring first control information from the reinforcement learning control model;
  inputting the current state information and the first control information to the dynamic model;
  acquiring predicted state information from the dynamic model;
  acquiring next state information from the simulation model; and
  comparing the predicted state information and the next state information.

8. The dynamic model based optimal control method according to claim 1, wherein the sample similarity is determined based on the predicted state information calculated based on the acquired state information and the dynamic model.

9. The dynamic model based optimal control method according to claim 8, wherein the sample similarity is determined by a smaller value in a previously determined similarity range as an error calculated between the state information and the predicted state information increases.

10. The dynamic model based optimal control method according to claim 1, wherein the calculating of optimal control information is performed based on a result of a weighted sum operation based on the first control information, the second control information, and the sample similarity.

11. The dynamic model based optimal control method according to claim 1, wherein the calculating of optimal control information includes:
  determining a weight corresponding to each of the first control information and the second control information based on the sample similarity; and
  calculating optimal control information based on a result of a weighted sum operation according to the determined weight.

12. The dynamic model based optimal control method according to claim 11, wherein in the determining as the sample similarity increases, a ratio obtained by dividing a first weight corresponding to the first control information by a second weight corresponding to the second control information is increased.

13. The dynamic model based optimal control method according to claim 1, wherein the dynamic model is consistently trained based on two or more state information acquired according to a time interval previously determined during the process of driving the vehicle.

14. The dynamic model based optimal control method according to claim 13, wherein the reinforcement learning control model is consistently trained by substituting a simulation model for learning into the consistently trained dynamic model.

15. A computer program stored in a non-transitory computer readable storage medium, wherein when the computer program is executed by one or more processors, the computer program causes the one or more processors to perform the following operations to perform dynamic model based optimal control and the operations include:
  an operation of acquiring state information including at least one state variable from one or more sensors of a vehicle thermal-management system, wherein the state information is acquired at a predetermined time interval during a process of driving the vehicle;
  an operation of calculating first control information by inputting the state information to a reinforcement learning control model implemented as a deep neural network executed on a tensor processing unit (TPU) or graphics processing unit (GPU);

an operation of calculating second control information from the state information based on a feedback control algorithm executed on a microcontroller within the same computing device;

an operation of determining a sample similarity of the state information using a trained dynamic model implemented as a recurrent neural network (RNN) configured to output a one-step-ahead predicted state information for the system;

an operation of calculating optimal control information based on the first control information, the second control information, and the sample similarity; and an operation of executing all steps within a real-time control loop having a cycle time not exceeding the predetermined time interval such that the optimal control information is transmitted to actuators of the vehicle thermal-management system in real time.

16. An apparatus for performing optimal control based on a dynamic model, comprising:

one or more processors;
a memory; and
a network unit, wherein the one or more processors are configured to:
acquire state information including at least one state variable;
calculate first control information by inputting the state information to a reinforcement learning control model;
calculate second control information from the state information based on a feedback control algorithm;
determine a sample similarity of the state information using a trained dynamic model;
determine a first weight corresponding to the first control information and a second weight corresponding to the second control information based on the sample similarity, wherein a ratio of the first weight to the second weight increases as the sample similarity increases;
calculate optimal control information based on a result of a weighted sum operation according to the determined first and second weights, the first control information, and the second control information.

17. The computer program according to claim 15, wherein the sample similarity is mathematically defined as an inverse-error function between the predicted state information and an actual next state information, such that the sample similarity is given by $1/(1+|e|_2)$, where e is the vector difference between the predicted state information and the actual next state information.

18. The dynamic model based optimal control method according to claim 1, comprising calculating the optimal control information as a similarity-weighted sum of the first control information and the second control information, such that the optimal control information is given by:

optimal control information=σ·(first control information)+(1−σ)·(second control information), where σ is a sample similarity derived from the error between predicted and actual next state.

* * * * *